United States Patent Office 3,565,844
Patented Feb. 23, 1971

---

3,565,844
URETHANE LATICES AND PROCESS FOR THE PREPARATION THEREOF
Oscar M. Grace, Madison Heights, and Pauls Davis, Gibraltar, Mich., assignors to Wyandotte Chemicals Corporation, Wyandotte, Mich., a corporation of Michigan
No Drawing. Filed Feb. 14, 1968, Ser. No. 705,317
Int. Cl. B32b 23/08; C08g 53/18; C08j 1/48
U.S. Cl. 260—29.2                                     5 Claims

ABSTRACT OF THE DISCLOSURE

Urethane latices which may be coagulated by acid or heat without degradation of the urethane polymer are prepared employing certain hybrid anionic-nonionic compounds as emulsifiers therefor. The emulsifiers are carboxylic acid salts of nonionic surfactants.

---

The present invention relates to urethane lactices. More particularly, the invention relates to the use of hybrid anionic-nonionic emulsifiers in the preparation of urethane latices.

Urethane latices are well known in the art as evidenced by U.S. Pat. Nos. 2,968,575, 3,213,049, and 3,294,724. They are generally prepared by chain extending in the presence of water an emulsified isocyanate-terminated prepolymer obtained by the reaction of an organic compound having at least two active hydrogen atoms with a stoichiometric excess of an organic polyisocyanate. Several anionic emulsifiers have been employed by the art in the preparation of urethane latices. A major disadvantage associated with known urethane latices is that the conventional emulsifiers employed during their preparation prevent the latices from being coagulated by acid or heat without degradation of the urethane polymer. As a result thereof, prior to the use of known urethane latices particularly in the production of dipped goods such as gloves, binders for non-woven fabrics, and fabric coatings, the conventional emulsifiers must be destroyed.

Accordingly, it is an object of the present invention to provide for urethane latices which may be coagulated by acids or heat without degradation of the urethane polymer. A further object of the present invention is to provide for urethane latices which when employed in coating applications result in coatings having substantially lower water absorption than coatings from conventional urethane latices. Still another object of the present invention is to provide for novel emulsifiers for urethane latices. These and other objects of the present invention will be apparent from the specification and examples which follow.

The above objects are accomplished in accordance with the present invention by the use of hybrid anionic-nonionic emulsifiers in the preparation of urethane latices. These emulsifiers provide for urethane latices which are readily coagulated by acids or heat.

The emulsifiers employed in the present invention are carboxylic acid salts of nonionic surfactants. The emulsifiers may be represented by the formula:

(I)        R—[O—(CH$_2$)$_a$—COOX]$_n$ wherein R together with attached oxygen is the residue of a nonionic surfactant having $n$ hydroxyl groups, $a$ is an integer from 1 to 20, $n$ is an integer from 1 to 6, and X is a cation selected from the group consisting of sodium, potassium, substituted and unsubstitued ammonium, morpholinium, and piperazinium. The emulsifiers which are preferably employed in the present invention may be represented by the formula (II)        R—[O—CH$_2$—COOX]$_n$ wherein R and X are as disclosed above and $n$ is 1 to 2.

The emulsifiers are generally prepared by carboxyalkylating a nonionic surfactant in the presence of a base. Any of the well known nonionic surfactants may be carboxyalkylated to prepare the emulsifiers useful in the present invention. Generally, the nonionic surfactants are the polyoxyalkylene adducts of hydrophobic bases wherein the oxygen/carbon ratio in the oxyalkylene portion of the molecule is at least about 0.5. Those compositions which are condensed with hydrophobic bases to provide a polyoxyalkylene portion having an oxygen/carbon atom ratio of at least 0.5 include ethylene oxide, butadiene dioxide and glycidol and the like. Ethylene oxide, for example, is condensed with the hydrophobic base in an amount sufficient to impart water solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates.

Typical hydrophobic bases which can be condensed with ethylene oxide in order to prepare nonionic surface active agents include mono- and polyalkyl phenols, polyoxypropylene condensed with a base having from about one to six carbon atoms and at least one reactive hydrogen atom, fatty acids, fatty amines, fatty amides, alkyl mercaptans, and fatty alcohols. The hydrocarbon ethers such as the benzyl or lower alkyl ether of the polyoxyethylene surfactant condencates are also advantageously employed in the compositions of the invention.

Among the suitable nonionic surfactants are the polyoxyethylene condensates of alkyl phenols having from about six to twenty carbon atoms in the alkyl portion and from about 5 to 30 ethenoxy groups in the polyoxyethylene radical. The alkyl substituent on the aromatic nucleus may be octyl, diamyl, polymerized propylene such as propylene tetramer and trimer, isooctyl and noyl. The benzyl ethers of the polyoxyethylene condensates of monoalkyl phenols impart good properties to the compositions of the invention. A typical product corresponds to the formula:

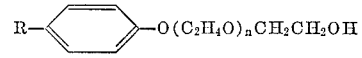

where R is an alkyl group, and $n$ is from about 5 to 30.

Other suitable water-soluble nonionic surfactants are cogeneric mixtures of conjugated polyoxyalkylene compounds containing in their structure at least one hydrophobic oxyalkylene chain in which the oxygen/carbon atom ratio does not exceed about 0.33 and at least one hydrophilic oxyalkylene chain in which the oxygen/carbon atom ratio is not less than about 0.5. Propylene oxide, butylene oxide, amylene oxide, and styrene oxide are illustrative of oxyalkylene compounds having an oxygen/carbon atom ratio not exceeding about 0.33 while ethylene oxide, butadiene dioxide, and glycidol, as previously pointed out, are illustrative of oxyalkylene compounds having an oxygen/carbon atom ratio of at least about 0.5. Although the hydrophobic chain has an oxygen/carbon atom ratio not exceeding about 0.33, it is often advantageous to include in this chain a small amount of ethylene oxide, that is, up to about fifteen weight percent, and likewise in the hydrophilic chain which has an oxygen/carbon atom ratio not less than about 0.5, it is often advantageous to include a small amount of propylene oxide or butylene oxide, that is, up to about fifteen weight percent, and the oxygen/carbon atom ratios described herein and in the claims are not intended to preclude such mixtures.

Among the conjugated polyoxyalkylene compounds which can be used in the compositions of the invention are those which correspond to the formula:

$$Y(C_3H_6O)_n(C_2H_4O)_mH$$

wherein Y is the residue of an organic compound having from about one to six carbon atoms and one reactive hydrogen atom, $n$ has an average value of at least about 6.4 as determined by hydroxyl number and $m$ has a value such that the oxyethylene portion constitutes about 10 to 90 weight percent of the molecule. Most of the surface active agents are more particularly described in U.S. Pat. No. 2,677,700.

Other conjugated polyoxyalkylene surface active agents which are most advantageously used in the compositions of the invention correspond to the formula:

$$Y[(C_3H_6O)_n(C_2H_4O)_mH]_x$$

wherein Y is the residue of an organic compound having from about two to six carbon atoms and containing $x$ reactive hydrogen atoms in which $x$ has a value of at least about two, $n$ has a value such that the molecular weight of the polyoxypropylene hydrophobic base is at least about 900, and $m$ has a value such that the oxyethylene content of the molecular is from about 10 to 90 weight percent. Compounds falling within the scope of the definition for Y include, for example, propylene glycol, glycerine, pentaerythritol, trimethylolpropane, ethylenediamine, triethylenetetramine, triisopropanolamine, and butylamine. Where Y is ethylenediamine, the compounds may be respresented by the formula:

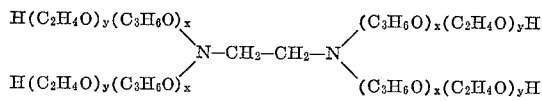

wherein $x$ and $y$ are integers. As already noted, the oxypropylene chains optionally, but advantageously, contain small amounts of ethylene oxide and the oxyethylene chains also optionally, but advantageously, contain small amounts of alkylene oxides having an oxygen/carbon atom ratio of not more than about 0.33 such as propylene oxide and butylene oxide. Most of these compounds are more particularly described in U.S. Pat. Nos. 2,674,619 and 2,979,528.

Other suitable poloxyethylene nonionic surface active agents are the ethylene oxide adducts of higher aliphatic alcohols having from about 8 to 22 carbon atoms in the aliphatic portion, and about 3 to 30 ethenoxy units in the oxyethylene portion. Typical products are blends of linear fatty alcohols containing an even number of carbon atoms condensed with about three to nineteen moles of ethylene oxide.

Other suitable onionic surface active agents are the propylene oxide adducts of condensates of ethylene oxide and higher aliphatic alcohols having from about 8 to 22 carbon atoms in the aliphatic portion. Various ratios of ethylene oxide and propylene oxide may be used.

Other suitable nonionic surfactants are the products prepared by condensing a mixture of ethylene oxide and propylene oxide with aliphatic alcohols having from about 8 to 22 carbon atoms in the aliphatic portion of the alcohol. Various ratios of oxides may be employed.

Other suitable surface active agents are the polyoxyalkylene surface active agents having heteric polyoxyethylene solubilizing chains. These polyoxyalkylene compounds conform to the following generic formula:

$$Y(-P-E-H)_x$$

wherein Y is the nucleus of an organic reactive hydrogen compound containing $x$ reactive hydrogen atoms and having up to six, inclusive, carbon atoms, $x$ is an integer, P is a hydrophobic polyoxyalkylene chain having an oxygen/carbon atom ratio of not more than 0.40, the molecular weight of P and the value of $x$ being such that the molecular, excluding E, has a molecular weight of at least about 400 to 900 and up to about 25,000, and E is a hydrophilic heteric polyoxyalkylene chain which (1) contains oxyethylene groups and at least five percent by weight of higher molecular weight oxyalkylene groups having at least three carbon atoms in their structure, and (2) has an average oxygen/carbon atom ratio of greater than 0.40, E being present in the composition to the extent that it constitutes from 5 to 90 weight percent of the total composition. These compositions are more particularly described in U.S. Patent No. 3,101,374. Mixtures of these compositions and fatty acid phosphates may also be used.

As mentioned above, the nonionic surfactants are generally carboxyalkylated in the presence of a base to prepare the hybrid emulsifiers useful in the present invention. Any standard carboxyalkylation procedure may be employed. Generally, however, the hybrid emulsifiers are prepared by carboxymethylating a nonionic surfactant with a haloacetic acid in the presence of a base which neutralizes the free chloroacetic acid and acts as an acceptor for the free hydrogen chloride. The resulting carboxylic acid salt may be separated from the reaction product and directly employed in the present invention or may be neutralized with an acid such as sulfuric acid to prepare the free carboxylic acid which may then be converted to a salt. This latter procedure is preferred if nitrogen-containing salts are to be used in the present invention. It is also possible to prepare the emulsifiers employed in the present invention by initially preparing the sodium or potassium salt of the nonionic surfactant and thereafter reacting these salts with a halogenated aliphatic acid or ester. Temperatures of from about 70° C. to 150° C. and reaction times of from one to five hours are generally employed during the carboxyalkylation reaction. Halogenated aliphatic acids other than chloroacetic acid which may be employed include bromoacetic acid, iodoacetic acid, chloropropionic acid, bromopropionic acid, iodopropionic acid, chlorobutyric acid, brmobutyric acid, iodobutyric acid, chlorocaproic acid, bromopalmetic acid, and chlorostearic acid and esters thereof such as ethylchloroacetate and butylbromopalmitate. Typical bases which may be employed include the alkali metals and alkali earth metal hydroxides, carbonates, oxides, and borates. Generally, from about 1 to 10 parts by weight, preferably from 2 to 6 parts, of emulsifier, based on 100 parts of prepolymer, will be sufficient to produce the emulsions of the present invention.

As mentioned above, the urethane latices of the present invention are generally prepared from three reactants, namely, an organic polyisocyanate, an organic compound having at least two active hydrogen atoms, and a chain extending agent. Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene - 2,6 - diisocyanate, mixtures of 2,4- and 2,6-, hexamethylene-1,6-diisocyanate, tetramethylene - 1,4 - diisocyanate, cyclohexane - 1,4 - diisocyanate, hexahydrotolylene diisocyanate (and isomers), naphthylene - 1,5 - diisocyanate, 1-methoxypyhenyl - 2,4 - diisocyanate, diphenylmethane-4, 4'-diisocyanate, 4,4'-biphenylene diisocyanate, 3,3' - dimethoxy - 4,4' - biphenyl diisocyanate, 3,3'-dimethyl-4,4'-biphenyl diisocyanate, and 3,3'-dimethyldiphenylmethane-4,4'-diisocyanate; the triisocyanates such as 4,4',4" - triphenylmethane triisocyanate, polymethylene polyphenylisocyanate and tolylene 2,4,6-triisocyanate; and the tetra-isocyanates such as 4,4'-dimethyldiphenylmethane 2,2',5, 5'-tetraisocyanate. Especially useful due to their availability and properties are tolylene diisocyanate, diphenylmethane - 4,4' - diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Patent No. 3,215,652.

Any organic compound having at least two active hydrogen atoms may be employed in the preparation of the polyurethane latices. The term "active hydrogen atoms" refers to hydrogen atoms which, because of their position in the molecule, display activity according to the Zerewitinoff test as described by Kohler in J. of Am. Chem. Soc., 49, 3181 (1927).

The active hydrogen atoms are usually attached to oxygen, nitrogen, or sulphur atoms. Thus, suitable active hydrogen-containing groups as determined by the Zerewitinoff method which are reactive with an isocyanate group include —OH, —NH, —COOH, and —SH. Examples of suitable types of organic compounds containing at least two active hydrogen-containing group which are reactive with an isocyanate group are hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, aliphatic thiols including alkane, alkene, and alkyne thiols having two or more —SH groups; diamines including both aromatic, aliphatic, and heterocyclic diamines, as well as mixtures thereof. Compounds which contain two or more different groups within the above-defined classes may also be used such as, for example, amino alcohols which contain an amino group and a hydroxyl group. Also compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-(4,4'-hydroxyphenol)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Patent No. 1,992,459. Polyethers which are preferred include the alkylene oxide addition products of trimethylolpropane, glycerine, pentaerythritol, propylene glycol, and 2,2-(4,4'-hydroxyphenyl)-propane and blends thereof having equivalent weights of from 250 to 5000.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a ployester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-secondary diamino naphthalene, and 2,4-secondary diamino tolylene; aliphatic polyamines such as N,N'-secondary ethylene diamine, N,N'-secondary 1,3-propylene diamine, N,N'-secondary 1,4-butylene diamine, and N,N'-secondary 1,3-butylene diamine. Alkylene oxide adducts of any of the above polyamines may also be used, particularly propylene oxide adducts of p-amino aniline and ethylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

The isocyanate-terminated prepolymers are ordinarily prepared by heating the organic polyisocyanate and the organic compound containing at least two active hydrogen atoms with agitation at a temperature of from about 60° C. to about 110° C., preferably from about 70° C. to about 90° C. A catalyst may be employed in this reaction if desired. If a catalyst is employed, temperatures below 60° C. may be used. The reactants are heated for a period sufficient to react all the hydroxyl groups, whereafter the prepolymer is allowed to stand and the free NCO content determined. Generally, total reaction time will be from about two hours to about four hours. However, if a catalyst is employed, a period of from about fifteen minutes to about one hour is sufficient.

The reaction is preferably carried out, but not necessarily, in the presence of a solvent. If the prepolymer is a fluid at processing temperatures, it is possible to carry out the reaction in the absence of a solvent. Convenient solvents are organic solvents having a boiling range above 90° C. when the reaction is to be carried out in open equipment. Lower boiling solvents may, of course, be used where the reaction is carried out in closed equipment to prevent boiling off the solvent at the temperatures of the reaction. The solvent, when used, may be added at the beginning, at an intermediate point, or at the end of the prepolymer stage, or after cooling of the formed prepolymer. The solvents to be used are preferably those in which the reactants are soluble. Ketones and esters may be used. The aliphatic hydrocarbon solvents such as the heptanes, octanes, and nonanes, or mixtures of such hydrocarbons obtained from naturally occurring petroleum sources such as gerosene, or from synthetically prepared hydrocarbons, may sometimes be employed. Cycloaliphatic hydrocarbons such as methylcyclohexane and aromatic hydrocarbons such as toluene may likewise be used. Hydrocarbon solvents such as toluene and benzene are preferred. The amount of solvent used may be varied widely. From 25 parts to 400 parts of solvent per 100 parts of active hydrogen-containing compound have been found to be operable. The excess solvent, where large amounts are employed, may be separated partially or completely from the polymer prior to emulsification in the water solution; sometimes the excess solvent is useful and is allowed to remain during the emulsification stage.

The amounts of organic polyisocyanate and organic compound having at least two active hydrogen atoms which are employed in the preparation of the prepolymers are such that the NCO/OH equivalent ratio is between 1.3:1 to 3:1, preferably 1.5:1 to 2:1. At ratios greater than 3:1, incompatible resins tend to form, while at ratios less than 1.3:1, gelling of the polymer tends to occur.

After the prepolymer is prepared, it is emulsified by combining it with an aqueous solution of an emulsifier with vigorous agitation. Emulsification of the prepolymer may occur by adding an aqueous solution of an emulsifier to the prepolymer, by adding the prepolymer to an aqueous solution of an emulsifier, by initially adding an emulsifier to the prepolymer reactants and then adding water after the prepolymer has been prepared by adding an emulsifier to an aqueous medium containing the prepolymer. The amount of water to be employed in the formation of the emulsion is not critical. When too small an amount of water is employed, emulsions are obtained which are too thick to handle readily while, on the other hand, dispersions which are too dilute are uneconomical to handle due to their excessive volume.

Chain extension of the prepolymers occurs by adding a chain extending agent to the emulsified prepolymer. The chain extending agent is preferably added in the form of an aqueous solution or dispersion thereof. However, it may be added alone or in the form of a solvent solution thereof.

The chain-extending agents which may be employed in the preparation of the latices of this invention are those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine 1,4-cyclohexane - bis-(methylamine), ethylene diamine, diethylene triamine, N-(2-hydroxypropyl)ethylene diamine, N,N'-di(2 - hydroxypropyl)ethylene diamine, piperazine, 2-methylpiperazine, morpholine, and dodecahydro-1,4,7,9-b-tetraazaphenalene.

The amount of chain-extending agent which is employed in the preparation of the latices of this invention is preferably about 1.0 equivalent of chain extending agent for each isocyanate equivalent. Up to about 1.3 equivalents may be employed. The chain extension step may frequently be assisted by agitation of the emulsion for some time after its initial formation. This is usually accomplished by means of a conventional paddle-type agitator at 30 r.p.m. to 90 r.p.m. or other conventional stirring equipment such as a Cowles Dissolver which aids in contacting the emulsion droplets with the chain extender.

The following examples serve to illustrate the invention. All parts are by weight unless otherwise specified. In the examples, tests were carried out in accordance with standard ASTM procedures. The procedures used were:

Tensile strength: D412–61
Modulus: D412–61
Elongation: D412–61
Shore A hardness: D676–59
Water adbsorption: D471–64

EXAMPLE I (A) Preparation of emulsifiers

A reaction vessel equipped with a stirrer, thermometer, inlet means, and heat exchange means was charged with 1031.5 parts (2.5 moles) of a nonionic surfactant which is the reaction product of five moles of ethylene oxide with one mole of octylpehnol and 207.5 parts (5.0 moles) of sodium hydroxide and stirred until the sodium hydroxide is uniformly dispersed in the surfactant. To the stirred charge, 237.5 parts (2.5 moles) of chloroacetic acid was gradually added maintaining the reaction temperature between 90° C. to 95° C. Total addition time was about forty minutes.

After the chloroacetic acid had been added to the reaction mixture, the mixture was stirred for an additional ten minutes at which time 1030 parts (2.5 equivalents) of 12% sulfuric acid was added to the reaction mixture. Stirring continued for thirty minutes, resulting in a creamy emulsion easily broken by heat. The salt solution was separated from the organic layer and five milliliters of 30% hydrogen peroxide was added to the organic layer. The organic layer was dried, stripped of volatiles, and filtered through a coarse sintered glass filter. A 98.7% of theory yield (1163 part) of the free carboxylic acid of the above-described nonionic surfactant was obtained. The ammonium and morpholinium salts of the carboxylic acid described above were prepared by dissolving 100 parts of the acid into 300 parts of water and adding thereto ammonium hydroxide or morpholine until the pH of the solution reached 8.0.

(B) Preparation of urethane latices

A reaction vessel equipped with a thermometer, stirrer, and heat exchange means was charged with 3960 parts of a 660 molecular weight polyol prepared from propylene oxide and Bisphenol A, 2,2-bis(4-hydroxyphenyl) propane, and 8905 parts of a 3000 molecular weight polyol prepared from propylene oxide and glycerine. To the vessel were then charged 3654 parts of tolylene diisocyanate (80/20 mixture of 2,4-2,6 isomers) in 1652 parts of toluene. The charge was stirred for about three hours at 80° C. to 90° C. After cooling the resulting prepolymer to about 25° C., the unreacted NCO-content of the prepolymer was determined.

Four parts of the morpholinium salt prepared above was then dissolved in 70 parts of water, cooled to about 10° C. The solution was then added with good agitation to 140 parts (40 parts toluene) of the cooled prepolymer. A mixture of 4.9 parts of 2-methylpiperazine and 1.6 parts of morpholine dissolved in 40 parts of cold water was then added with vigorous agitation to the emulsifier prepolymer. A stable emulsion resulted.

To determine whether the latex so prepared could be coagulated, alum was then gradually added to a portion of the latex. Films were cast from another portion of the latex and the physical properties of the films were tested. The above procedure was duplicated three times with the exception that different emulsifiers were employed. The three emulsifiers employed were (1) ammonium salt prepared above, (2) free acid prepared above, and (3) a conventional emulsifier which is dihydric polyoxyethylene polyoxypropylene having a molecular weight of 16,250, a polyoxyethylene content of about 80% by weight, and a polyoxypropylene base molecular weight of about 3,250. The results of the tests are presented in Table I below.

TABLE I

| Emulsifier | Morpholinium salt | Ammonium salt | Free acid | Conventional |
|---|---|---|---|---|
| Parts of 10% aqueous alum solution required for coagulation | 10 | 10 | >50 | >50 |
| Physical properties of film: | | | | |
| Tensile strength, p.s.i | 1,807 | 1,870 | 1,825 | 1,505 |
| 300% modulus | 917 | 1,100 | 860 | >35 |
| 100% modulus | 472 | 455 | 390 | 350 |
| Percent elongation | 462 | 462 | 478 | 495 |

The above results indicate that the urethane latices of the present invention are readily coagulated by alum without any degradation of the urethane polymer whereas urethane latices prepared with conventional emulsifiers are not coagulated by alum.

The above latices were then evaluated for dip coating cotton canvas gloves. The evaluation consisted of dipping a cotton glove into a 2.0% alum solution, drying the dipped glove at 300° F. for ten minutes, dipping the glove into a candidate latex, removing the glove from the latex and curing for fifteen minutes at 300° F. Only those latices prepared from the carboxylic acid salts in accordance with the present invention were useful in this application. The latices prepared from the standard emulsifiers did not coagulate.

EXAMPLE II

Following the procedure described in Example I, 646 parts of a monionic surfactant which is the reaction product of ten moles of ethylene oxide with one mole of octylphenol was reacted with 135 parts of chloroacetic acid in the presence of 26.4 parts of sodium hydroxide. The reaction mixture was neutralized with sulfuric acid resulting in 675 parts of the carboxylic acid of the above-described nonionic surfactant.

The ammonium salt of this acid was then prepared as described in Example I and various urethane latices were prepared employing 6 parts of this salt as emulsifier therefor. The latices were prepared in the manner set forth in Example I from the following reactants:

Latex II A

Reactant: Parts
Isocyanate-terminated prepolymer prepared by the reaction of 7.4 parts of tolylene diisocyanate (80/20, 2,4-2,6 isomers) with 90.5 parts of a 6430 molecular weight polyol prepared by capping with ethylene oxide a propylene oxide adduct of trimethylolpropane (5% ethylene oxide based on total weight) _____ 100
Toluene _____ 40
Water _____ 110
2-Methylpiperazine _____ 1.94

Latex II B

Reactant: Parts
Isocyanate-terminated prepolymer prepared in Example I _____ 100
Toluene _____ 40
Water _____ 110
2-Methylpiperazine _____ 4.9
Morpholine _____ 1.6

Latex II C

Reactant: Parts
Isocyanate-terminated prepolymer prepared by the reaction of 32.8 parts of toluene diisocyanate with 59.2 parts of a blend of polypropylene glycols having an average equivalent weight of 275 (NCO/OH ratio of 1.75:1) _____ 100
Toluene _____ 40
Water _____ 110
N-(2-hydroxypropyl)ethylene diamine _____ 8

All three latices prepared with the ammonium salt discussed above were readily coagulated by the addition of ten parts of alum whereas latices prepared from the free acid did not coagulate even after the addition of fifty parts of alum. Physical properties of film cast from the latices are recorded in Table II below.

TABLE II

| Latex | II A | II B | II C |
|---|---|---|---|
| Tensile strength, p.s.i | 523 | 2,250 | 3,733 |
| 300% modulus | 170 | 1,050 | 2,750 |
| 100% modulus | 76 | 390 | 1,267 |
| Percent elongation | 612 | 440 | 410 |
| Shore A hardness | 37 | 68 | 93 |

The above results indicate that the urethane latices of the present invention are readily coagulated by alum without any degradation of the urethane polymer whereas urethane latices prepared with conventional emulsifiers are not coagulated by alum.

EXAMPLE III

Following the procedure described in Example I, 490 parts of a nonionic surfactant which is the reaction product of 2060 parts of octylphenol and 2940 parts of propylene oxide dissolved in 400 parts of benzene was reacted with 135 parts of chloroacetic acid in the presence of 48.6 parts of a 54.3% sodium hydride solution. The reaction mixture was neutralized with sulfuric acid resulting in 525 parts of the carboxylic acid of the above-described nonionic surfactant. The sodium, ammonium, and morpholinium salts of the acid were prepared in the manner described in Example I. Four parts of these salts was then employed as emulsifiers for the preparation of urethane latices from the following reactants in the manner described in Example I.

Reactant: Parts
Isocyanate-terminated prepolymer prepared by the reaction of 24.36 parts of toluene diisocyanate with 122.4 parts of a 6430 molecular weight triol prepared by capping with ethylene oxide a propylene oxide adduct of trimethylolpropane (5% ethylene oxide based on total weight) and 26.4 parts of a 660 molecular weight polyol prepared from propylene oxide and Bisphenol A _____ 100
Toluene _____ 40
Water _____ 110
2-methylpiperazine _____ 3.65
Morpholine _____ 0.35

All three latices were readily coagulated by the addition of ten parts of alum. Furthermore, films cast from the latices illustrate that the urethane polymers were not degraded by the use of the emulsifiers of the invention.

EXAMPLE IV

A reaction vessel equipped as described in Example I was charged with 800 parts of a nonionic surfactant having a molecular weight of about 2000 prepared by condensing ethylene oxide with polypropylene glycol (ethylene oxide content of about ten weight percent), 88 parts of benzene and 21.6 parts of 100% sodium hydride. To the stirred charge was added 110.2 parts of ethylchloroacetate, and the reaction mixture was heated to reflux and maintained there for two hours. The reaction mixture was then saponified with 72 parts of 50% sodium hydroxide under reflux for three hours, at which time one liter of 10% sulfuric acid was added to the reaction mixture. After a hydrogen peroxide treatment, the reaction mixture was separated into layers and the benzene layer was evaporated. A yield of 810 parts of the carboxylic acid of the above-described surfactant was obtained. The sodium salt of this acid was prepared by adding 20 parts of the acid to 180 parts of water and 0.4 part of sodium hydroxide.

A polyurethane latex was prepared substantially as described in Example I with the sole exception that six parts of the sodium salt described above was employed as emulsifier. The latex was easily coagulated by the addition of alum. Physical properties of film cast from the latex are presented below.

Tensile strength, p.s.i. _____ 2150
300% modulus _____ 1283
100% modulus _____ 533
Percent elongation _____ 457

The latices of this invention are useful in many applications. Among the many articles and uses to which these latices are applicable may be mentioned the following: fabric coatings for rainwear, tarpaulins and baby pants; fabric and textile filament impregnants to improve abrasion resistance and wrinkle resistance; fabric laminating adhesives; paper coatings and impregnants for improved durability, grease resistance, gloss and wet and tear strength; binders for non-woven fabrics; industrial adhesives; production of urethane films anl fibers, leather coating and impregnants for improved abrasion resistance and water resistance; and industrial coatings for metal, wood, and concrete.

What is claimed is:

1. In a process for the preparation of urethane latices by chain extending in an aqueous medium an emulsified NCO-terminated prepolymer prepared by the reaction of an organic compound having at least two active hydrogen atoms with a stoichiometric excess of an organic polyisocyanate, the improvement which comprises emulsifying said prepolymer with a compound of the formula:

$$R-[O-(CH_2)_a-COOX]_n$$

wherein R together with attached oxygen is the residue of a nonionic surfactant having $n$ hydroxyl groups, $a$ is an integer from 1 to 20, $n$ is an integer from 1 to 6, and X is a cation selected from the group consisting of sodium, potassium, ammonium, morpholinium, and piperazinium.

2. The process of claim 1 wherein the organic compound having at least two active hydrogen atoms is a blend of polyalkylene polyether polyols.

3. The process of claim 1 wherein the emulsifier is a compound of the formula:

$$R-[O-CH_2-COOX]_n$$

wherein R together with attached oxygen is the residue of a nonionic surfactant having $n$ hydroxyl groups, $n$ is 1 or 2, and X is a cation selected from the group consisting of sodium, potassium, ammonium, morpholinium, and piperazinium.

4. The process of claim 1 wherein the chain-extending agent is 2-methylpiperazine.

5. Urethane latices prepared in accordance with claim 1.

References Cited

UNITED STATES PATENTS

| | | | |
|---|---|---|---|
| 2,623,900 | 12/1952 | Hofer | 260—521 |
| 2,968,575 | 1/1961 | Mallonee | 260—29.2 |
| 3,148,173 | 9/1964 | Axelrod | 260—29.2 |
| 3,178,310 | 4/1965 | Berger | 260—29.2 |
| 3,210,302 | 10/1965 | Bowell et al. | 260—29.2 |
| 3,281,397 | 10/1966 | Axelrod | 260—29.2 |
| 3,294,724 | 12/1966 | Axelrod | 260—29.2 |
| 3,437,624 | 4/1969 | Dawn et al. | 260—29.2 |

DONALD J. ARNOLD, Primary Examiner

A. H. KOECKERT, Assistant Examiner

U.S. Cl. X.R.

117—143; 260—521